United States Patent

[11] 3,617,744

[72] Inventor Carleton D. Irish
Neptune, N.J.

[21] Appl. No. 838,259
[22] Filed July 1, 1969
[45] Patented Nov. 2, 1971
[73] Assignee Bell Telephone Laboratories, Incorporated
Murray Hill, N.J.

[54] METHOD AND APPARATUS FOR CIRCUIT MODULE TESTING BY COMPARISON OF A FLUORESCENT IMAGE WITH A STANDARD PATTERN

10 Claims, 9 Drawing Figs.

[52] U.S. Cl. .......... 250/71, 174/68.5, 250/83.3 UV, 250/219 DR, 356/165, 356/168
[51] Int. Cl. .......... G01b 9/08
[50] Field of Search .......... 250/83.3 R, 71 R, 71.5, 83.3 H, 72, 73, 76, 71 T, 83.3 HP; 313/108 A, 108 R, 109.5 XR; 356/165, 168, 166; 324/158 F

[56] References Cited

UNITED STATES PATENTS

| | | | |
|---|---|---|---|
| 3,418,470 | 12/1970 | Birkeland | 250/71 |
| 3,280,370 | 10/1966 | Nehrich | 313/108 A |

*Primary Examiner*—James W. Lawrence
*Assistant Examiner*—D. C. Nelms
*Attorneys*—R. J. Guenther and Edwin B. Cave

ABSTRACT: Substrate-supported metallic circuitry is manufactured and tested, by forming it on dielectric substrate having a fluorescent character and irradiating the substrate with ultraviolet light. The resulting shadow image of the metallic circuitry is then superimposed on the negative image of a test mask shaped according to the desired circuitry configuration. The negative image of the circuitry is also superimposed upon the positive image of the mask. Passage of light through the superimposed images indicates defects.

INVENTOR
C. D. IRISH
BY Leo Stanger
ATTORNEY

METHOD AND APPARATUS FOR CIRCUIT MODULE TESTING BY COMPARISON OF A FLUORESCENT IMAGE WITH A STANDARD PATTERN

BACKGROUND OF THE INVENTION

This invention relates to the manufacture of circuit modules, such as printed circuit boards or thin-film circuit plates, wherein a dielectric substrate supports metallized circuitry, and particularly to the testing of the circuitry in such modules for dimensional accuracy, short circuits, open circuits, latent defects, and the like.

In the past, testing of such modules has been accomplished electrically or by inspection. Electrical testing was cumbersome and frequently failed to locate potential points of failure. For example, if a conductor or a thin-film resistor was too narrow or had a hole, it may momentarily have carried the desired currents. However, in prolonged usage, the narrow neck may have overheated and failed. Prior testing often failed to uncover such defects. Moreover, such testing was time consuming. Inspection required continuous use of skilled personnel who sometimes found it difficult to discern the boundaries between the circuitry and substrate.

THE INVENTION

According to a feature of the invention, these deficiencies are overcome by forming the circuitry on dielectric fluorescent substrates and irradiating the substrates with one or more energy bands outside the visible spectrum. At the same time ambient visible light is excluded from the substrate. The fluorescent substrate then produces bands of visible radiation to give an optically visible shadow image of the opaque metallized circuitry over a brightened background. This furnishes a clear image of the boundaries between the circuitry and the substrate. It thereby furnishes a clear view of defects or potential defects such as pinholes, breaks, neckdowns and short circuits.

According to another feature of the invention, the substrate is made fluorescent by including therein fluorescent materials. These may be distributed throughout the substrate or coated on the substrate.

According to still another feature of the invention, the mechanical accuracy of the shape of the circuitry is tested by comparing it with one or more derived standards whose configurations conform to the desired shape. According to a feature of the invention such a standard is embodied as a physical mask to which the shadow image of the circuitry is compared.

According to another feature of the invention, the comparison is accomplished by scanning the shadow image formed by the irradiated fluorescence and comparing it to the negative image of the standard. Where the standard is a mask, this involves superimposing an image of the mask, such as the mask itself, upon the shadow image. A lack of registration is indicative of the departure from the desired standard. This exposes defects.

According to another feature of the invention, the negative of the shadow image is compared with the positive of the standard, such as a back-lighted test mask, and the positive of the shadow image is compared with the negative of the standard. One comparison indicates presence of metal beyond its desired boundaries. The other comparison indicates missing portions of metal.

According to another feature of the invention, the negative image as well as the positive image of the standard is enlarged at predetermined portions to allow for tolerances during the comparison.

According to still another feature of the invention, reference marks or alignment dots are provided on the substrate for aligning the shadow image of the circuitry with the derived standard.

According to still another feature of the invention, scanning is accomplished by scanning tubes similar to those used for television scanning.

According to still another feature of the invention, alignment means, using images of the alignment points, move the images in response to the scanning until they are aligned.

These and other features of the invention are pointed out in the claims. Other objects and advantages of the invention will become known from the following detailed description when read in light of the accompanying drawings.

DESCRIPTION OF PREFERRED EMBODIMENT

Figure 1:
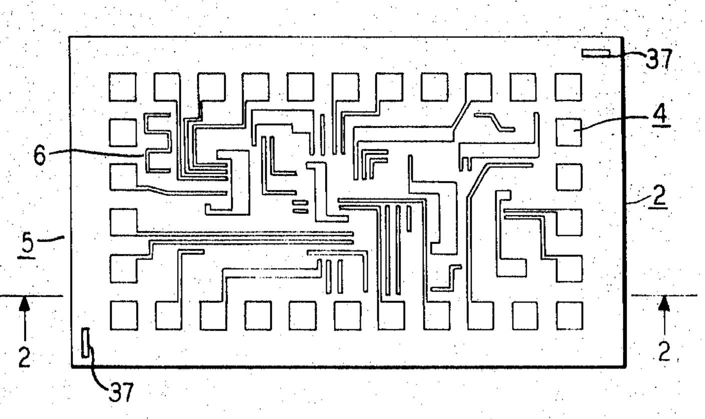
FIG. 1 is a plan view of a thin-film circuit module manufactured and tested according to features of the invention.
Figure 2:
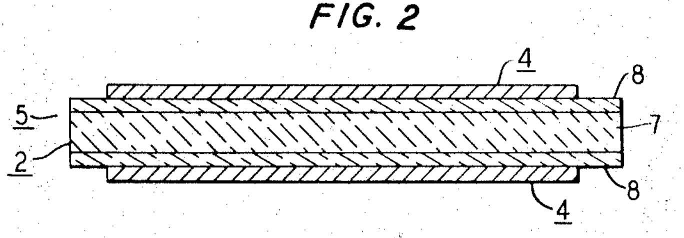
FIG. 2 is a cross section of FIG. 1.
Figure 3:
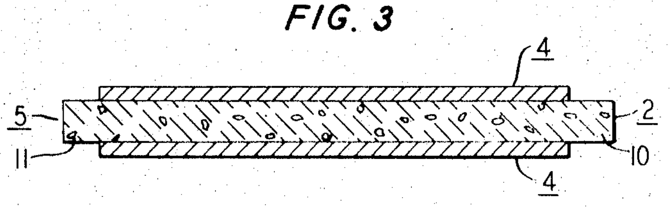
FIG. 3 is a cross section of another module manufactured and tested according to features of the invention.

In FIGS. 1 to 4, dielectric substrates 2 support metallic circuitry 4 on their upper faces and undersides to form electrical modules 5 that can be connected with other modules or other electrical components for the purpose of forming a complete electrical network. In FIGS. 1, 2 and 3 the circuitry 4 is composed of variously shaped metal elements 6 that include circuit components such as thin-film resistors, capacitors and leads.

Figure 4:
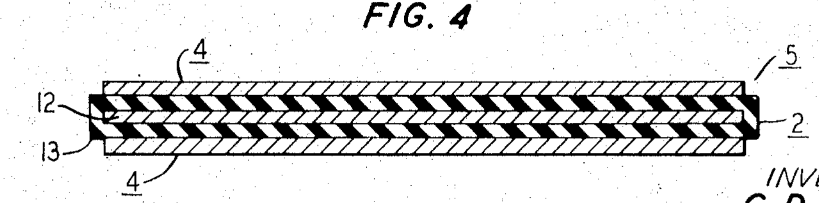
FIG. 4 is a cross section of a printed circuit board that represents another module manufactured and tested according to features of the invention.

In FIG. 4 the module 5 is a printed circuit board. Here, the circuitry 4 constitutes leads which connect discrete components to be mounted on the board.

In FIGS. 1 and 2 the substrate 2 is composed of an alumina ceramic wafer 7 with upper and lower glazes 8. The glazes have maximum thicknesses of 0.003 inches. They are, for example, composed of the materials described in the American Ceramic Society Bulletin, Volume 47, No. 5 of May 7, 1968, pages 511 et seq. combined with 0.01 to 20 percent by weight fluorescent rare earth oxides. Examples of the compositions of such rare earth oxides and their percentages in the glazes 8 are 2.5 percent $Eu_2O_3$, 5 percent $Eu_2O_3$, 7.5 percent $Eu_2O_3$, 1 percent $Dy_2O_3$, 2.5 percent $Eu_2O_3$ plus 1 percent $Dy_2O_3$, 1 percent $Sm_2O_3$, and 1 percent $Tb_2O_3$. These fluorescent materials are made part of the glazes 8 by grinding them with the glaze material in an alumina ball mill jar. They then are treated together with the glaze material as the glaze material is treated and applied to the ceramic. The thin-film circuitry 4 is then applied in the usual manner.

In the substrate 2 of FIG. 3 an alumina ceramic wafer 10, similar to the material of the wafer 7 includes interior particles 11 of the described fluorescent materials.

In the substrate 2 of FIG. 4 a steel center plate 12 supports a surrounding dielectric epoxy layer 13. The circuitry 4 is printed on the epoxy. The epoxy layer 13 is fluorescent and can be activated by ultraviolet light. The substrate 2 of FIG. 4 may also be a glass-epoxy board.

The manufacture of the steel-epoxy-printed circuit board corresponds to the usual manufacture. It involves coating the steel with epoxy, and applying the circuitry 4. Manufacture of the ceramic-substrate modules corresponds to the usual steps of manufacturing them, namely, forming the ceramic, adding the glaze, such as by spraying, or powder deposition, where such glaze is applied, and forming the circuitry 4. In FIGS. 1, 2 and 3, however, the manufacture involves the additional step of adding the fluorescent materials either in the ceramic material shown in FIG. 3 during its formation or in the glaze material as shown in FIG. 2.

According to another embodiment of the invention, fluorescent materials are applied on the ceramic wafer 10 after the wafer or module has been formed. This is done by dipping the wafer or the module into a solution of fluorescent material, or spraying it with the solution. The solution on the circuitry is removed by wiping the entire face of the module. The solution then remains on the ceramic wafer's surface.

Figure 5:
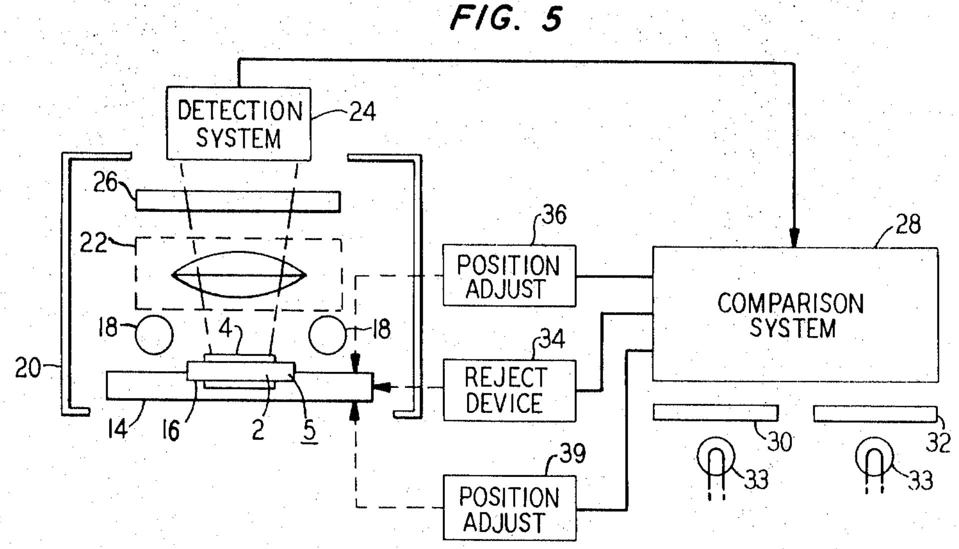
FIG. 5 is a schematic block diagram illustrating a system for testing modules according to features of the invention.

FIG. 5 illustrates an apparatus for testing the circuitry of the modules illustrated in FIGS. 1 and 4. In FIG. 5 a movable support 14 holds the module 5 within a suitable recess 16. Light from ultraviolet lamps 18 energizes the fluorescent substrate 2 so as to produce a sharply defined shadow image of the circuitry 4 on one face of substrate 2. A shade 20 protects the module so as to exclude ambient light. An optical system 22 focuses on the resulting irradiated shadow image and passes it to a detection system 24 through an ultraviolet filter 26. The latter eliminates reflected ultraviolet radiation from the detector and passes only the fluorescence produced within the substrate. The detection system 24 includes a scanning system for scanning the image and transmits the scanned signal to a comparison system 28 which simultaneously scans a back-illuminated, opaque mask 30 that has the shape of the desired pattern to which the circuitry 4 is to conform. A second back-illuminated, opaque mask 32 is the negative of the mask 30. Incandescent lamps 33 back light the masks 30 and 32. The comparison system 28 compares the positive of the image in the detection system 24 to the image of the negative mask 32 and also compares the negative of the image detected by the detector 24 to the image of the positive mask 30.

Essentially the comparison system 28 superimposes the positive of the shadow image of the actual circuitry 4 with a negative of the shadow image of the desired circuitry. Light then passes through the superimposed images only where the patterns do not register or conform. Similarly, the negative image is superimposed on the positive mask so that again light passes through the superimposed images only where the two shapes do not conform. Failure to conform indicates defects such as pin holes, short circuits, open circuits, dimensional inaccuracies and other unacceptable conditions. A threshold system in the comparison system 28 indicates whether the passage of light through the superimposed images, due to lack of registration, is sufficient to make the circuitry 4 unacceptable. If it is, it actuates a reject device 34 and a position adjuster 36 that move the support 14 out of the optical path and eject the module from the support 14.

According to an embodiment of the invention the masks may each extend slightly, by a predetermined amount, beyond the desired dimensions at specific locations. This allows for tolerances in the module during the comparison.

In order that the failure of registration, due to light passing through the compared images, actually indicate defects in the circuitry 4, it is essential that the module be aligned correctly with the masks. To insure correct alignment, the substrate 2 carries two reference marks or alignment dots 37, as shown in FIG. 1. Corresponding positive and negative marks are provided in the masks 30 and 32. Prior to actual measurement, an alignment blanking system within the comparison system 28 allows the latter only to compare the marks 37 with the corresponding marks on the mask. A position adjust system 39 responds to the blanked comparison system 28 to move the support 14 until the marks 37 are in registration with those on the masks. According to one embodiment of the invention the position adjust system adjusts the position of the support 14, the mask 30, and the mask 32.

Figure 6:
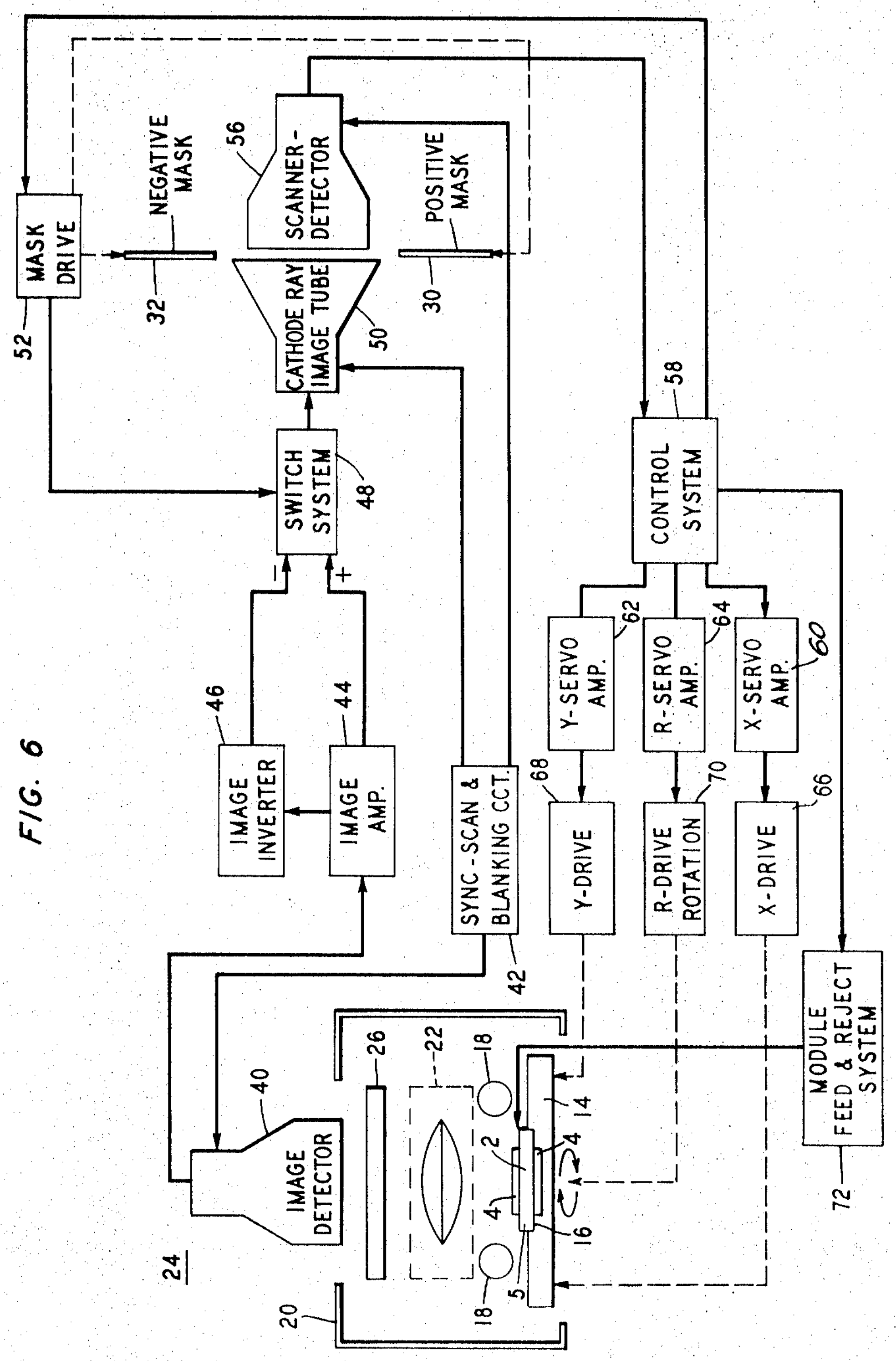
FIG. 6 is a more detailed block diagram for performing the testing according to features of the invention.

FIG. 6 illustrates a system such as that of FIG. 5 in more detail. Here again, a support 14 holds a module 5 with circuitry 4 in a recess 16. Light from an ultraviolet lamp 18 irradiates the fluorescent substrate 2. The optical system 22 furnishes an image of the circuitry upon an illuminated background through the ultraviolet filter 26. In FIG. 6 the detection system 24 is composed of an image detection tube or image detector 40 of the television type. The latter receives synchronizing, scanning and blanking signals from a synchronizing scanning and blanking circuit 42. An image amplifier 44 amplifies the resulting shadow image and applies it to an image inverter 46 so that between the amplifier and the inverter there exists a positive and negative image. A selector 48 applies one or the other of the signals to a cathode-ray image tube 50.

A mask drive 52 first moves the negative mask 32 over the face of the cathode-ray image tube 50. At the same time it actuates the selector 48 to apply the positive image coming from the image amplifier 44 on the cathode-ray image tube 50. The selector 48 actuates the circuits 42 to blank out the entire circuitry 4 and allow detection only of the reference marks 37. If the reference marks appearing in the cathode-ray image tube 50 coincide with those in the negative mask, a scanner detector 56 receives no light. Both the cathode-ray image tube 50 and the scanner detector 56 receive synchronizing and scanning and blanking signals from the circuit 42.

In the event that the reference marks do not coincide because the position of the sample substrate is incorrect, light passes through to the scanning detector 56. In response to such light the scanning detector 56 actuates a control system 58. The latter furnishes correction signals to an X-servoamplifier 60, a Y-servoamplifier 62 and a rotational servoamplifier 64. These amplifiers actuate respective X-, Y- and rotational drives 66, 68 and 70 for changing the position of the support 14 until the images of the reference marks 37 and those of the mask register.

The circuit 42 thereafter allows both the cathode-ray image tube 50 and the scanner detector 56 to compare the entire negative mask with the entire positive image. Should any appreciable light now pass between the cathode-ray image tube 50 and the scanner detector 56 it would indicate a lack of conformity between shapes of the negative mask 32 and the circuitry 4. The control 58 then actuates a module feed and reject system 72 and rejects the module. At the same time it feeds a new one to the support 14 or feeds a new support 14 with a new module into position.

If the amount of light detected by scanner detector 56 is below a threshold value the control 58 actuates the mask drive 52 and shifts the positive mask 30 between the cathode-ray image tube 50 and the scanning detector 56 while removing the negative mask 32. At the same time the mask drive 52 actuates the selector 48 to furnish a negative image from the image inverter 46 to the cathode-ray image tube 50. The image now appearing on the cathode-ray image tube is that of an illuminated circuit on a dark background. The circuit 42 again first blanks out the image and allows only the reference marks 37 to be detected. The control system 58 again causes the servoamplifiers 60, 62 and 64 to actuate the X-, Y- and R-drives 66, 68 and 70 and thereby properly position the support 14.

If now, light beyond a threshold value passes to the scanning detector 56 from the cathode-ray tube 50 it indicates that the shape of circuitry 4 protrudes beyond the desired shape, that is, beyond the edges of the underlying mask image or exists in undesired areas. This may be indicative of short circuits or other defects and require rejection of the sample. The control 58 then actuates the module feed and rejection system 72 to remove the sample. If the amount of light is below the threshold value the support 14 and sample are passed to the succeeding assembly stage and a new sample placed in the support or in the succeeding support.

In this way by irradiating the fluorescent substrate so as to create a shadow image of the circuitry, comparing it with a negative mask, and then comparing the negative of the shadow image with a positive mask it is possible to detect incipient and existing failures in the sample module being tested.

The masks, according to one embodiment of the invention, are made to allow for permissible departures in the shape of the circuitry 4. The entire positioning of the module-testing repositioning and testing process may be accomplished within approximately 5 seconds. When the substrate feed and reject system feeds the sample to its next assembly position or rejects it, the mask drive returns the negative mask over the face of the cathodeyray image tube 50 and removes the positive mask.

Figure 7:
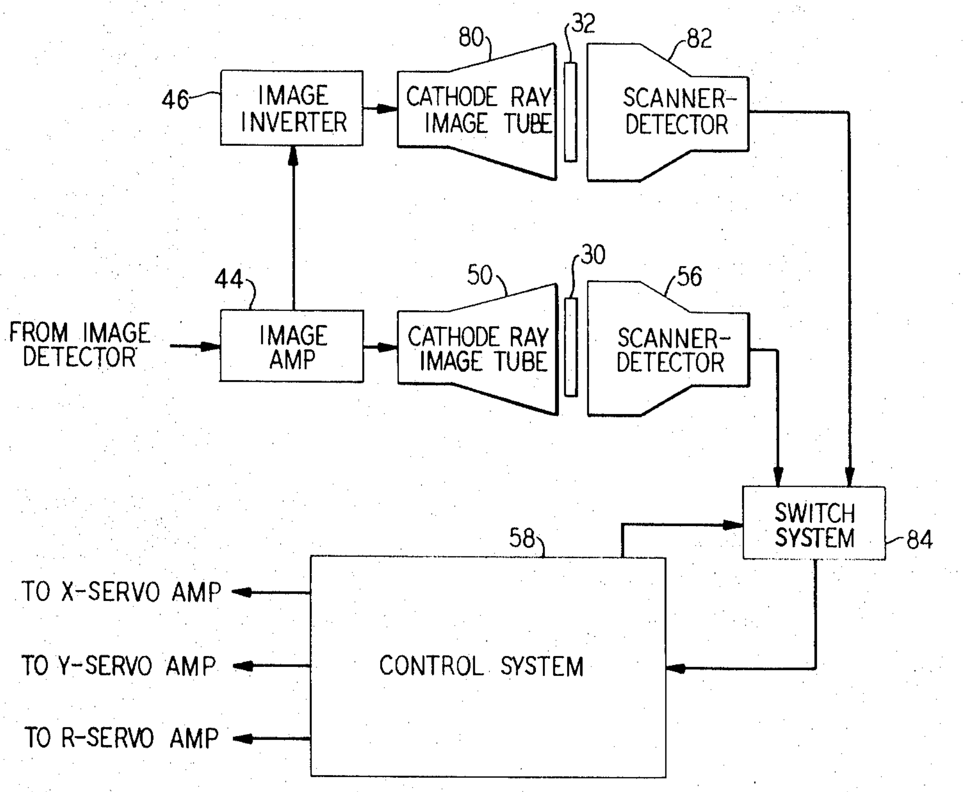
FIG. 7 is a block diagram illustrating an alternate embodiment of some of the details illustrated in FIG. 6.

The speed of operation can be increased by replacing the mask drive 52 and the selector 48 with the system shown in FIG. 7. Here, the image amplifier 44 connects directly to the cathode-ray image tube 50. The negative mask 32 is permanently placed between the face of the cathode-ray image tube 50 and the scanning detector 56. The image inverter 46 provides a signal to a second cathode-ray image tube 80 which faces a second scanning detector 82. The positive mask 30 is placed between the cathode-ray image tube 80 and scanning detector 82. A switch system 84 responding to the control 58 first feeds the output of one and then the other scanning detector to the control 58. This eliminates the time required to shift masks. It also eliminates the need to reposition the sample after one mask is removed and replaced with the other in a test cycle.

Figure 8:
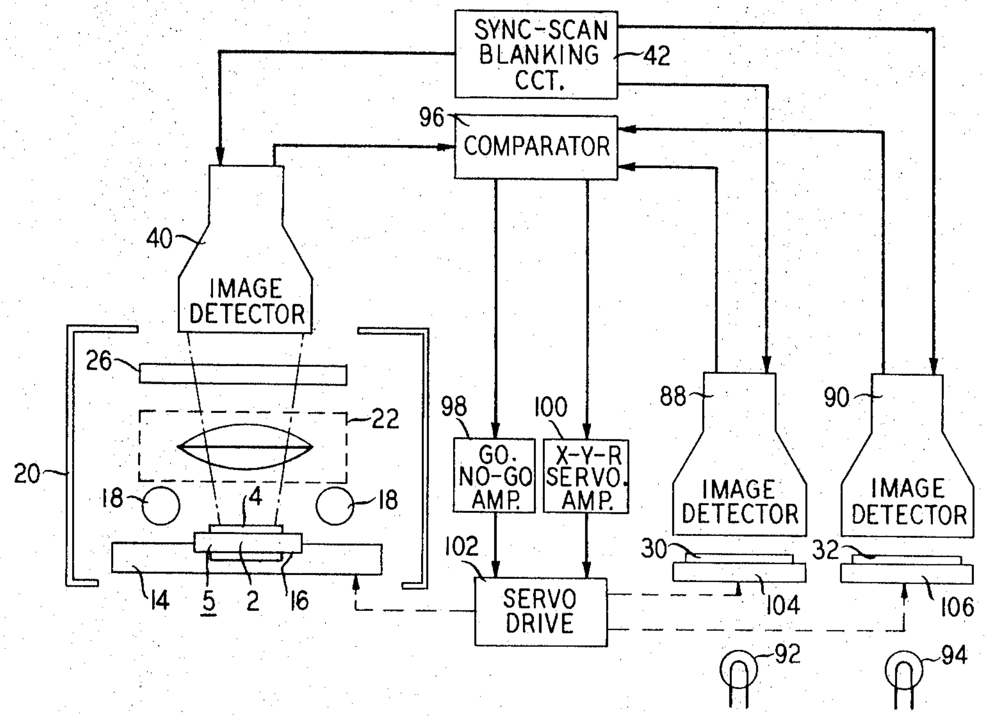
FIGS. 8 and 9 are block diagrams of other systems embodying features of the invention.

The invention may also be practiced as shown in FIG. 8. Here again, a module 5 lies in a recess 16 of a support 14. The fluorescent substrate 2 is energized by the ultraviolet light from the lamps 18. The optical system 22 again applies the image of the circuitry 4 on the substrate 2 to the image detector 40 through the ultraviolet filter 26. Two separate image detectors 88 and 90, respectively, detect the positive and negative masks 30 and 32 as they are illuminated by incandescent lamps 92 and 94. Signals from these scanning image detectors are applied to a comparator 96 which successively compares the positive image from the image detector 40 with the negative mask 32 and the negative image in the detector 40 with the positive mask 30. The comparison may be performed by a logic system since signals coming from the image detectors 40, 88 and 90 are each the result of scans that are synchronized by the same synchronizing, scanning and blanking circuit 42. Two separate masks 30 and 32 are used rather than a single mask with image inverters to give each mask a shape that allows for permissible extensions or contractions of the circuitry. The comparator actuates a GO, NO-GO system 98 that passes samples to successive manufacturing operations or rejects them.

Prior to actual tests the comparator 96 operates an X-Y-R-servoamplifier 100 comparable to the servoamplifier 60, 62 and 64 of FIG. 6 for the purpose of actuating a drive 102 comparable to the X-, Y-, and R-drive and rotational drive 66, 68 and 70 to align reference marks 37 on the substrate 12 with corresponding marks on the masks 30 and 32. During this alignment the images are blanked out. This aligns the respective images. The masks 30 and 32 are mounted on controllable translucent mounts 104 and 106 that are also actuated by the drive 102 so that they are in line with each other.

The invention contemplates the elimination of the amplifier 100 and drive 102 and aligning the images themselves within the comparator on an electronic basis. This further reduces the total test time.

Figure 9:
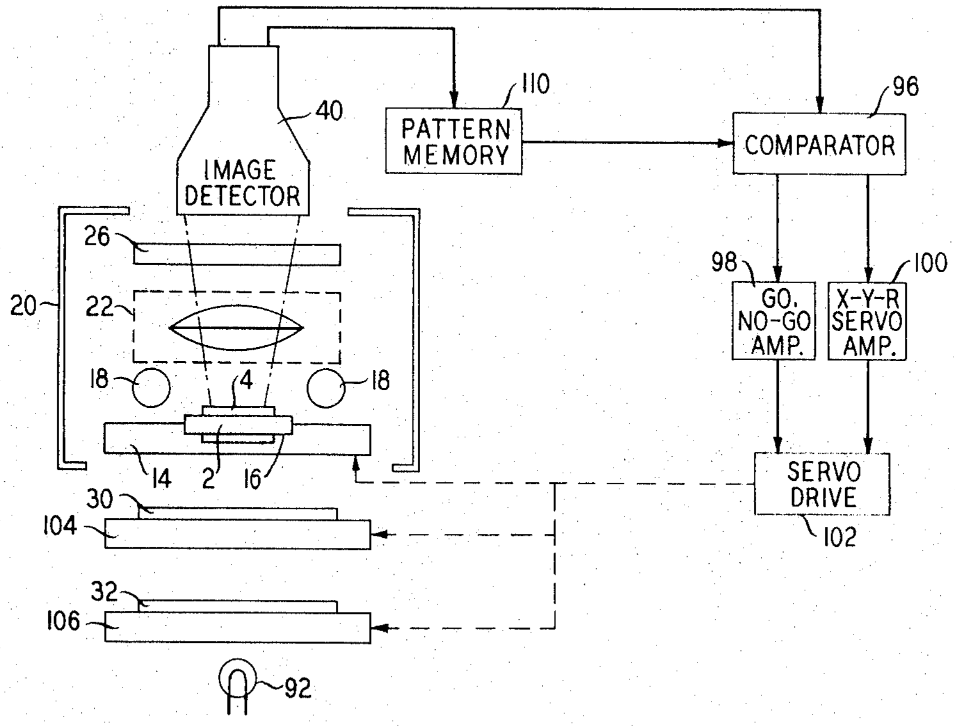

The invention may also be practiced as shown in FIG. 9. Here the image detector 40 scans the module to be tested. However, it first scans the mask 30 and the mask 32. These masks are successively moved into position on the translucent supports 104 and 106 by means of the servodrive 102. The masks 30 and 32 each include reference marks for alignment of the sample. A lamp 92 corresponding to the lamp of FIG. 8 illuminates the masks 30 and 32 when they are placed in the position normally occupied by the module to be tested. The detector 40 scans the masks 30 and 32 successively and stores the information in a memory 110. Thereafter the masks need no longer be used. A module to be tested is placed on the support 14 and irradiated as in FIGS. 5 to 8 by light from the ultraviolet lamps 18. The scanner detector then operates as in FIGS. 5 to 8 and causes the comparator 96 to successively compare the scanning information obtained from the module with that in the memory. Suitable blanking means in the comparator first furnish signals for the X-Y-R-servoamplifier 100 and the servodrive 102 to place the support mounted module in correct position for scanning. The comparator then detects the shape of the circuitry 4 with the images in the memory 110. It actuates a GO, NO-GO amplifier 98 which in turn actuates the servodrive 102. The latter either ejects the module if it is defective or passes it on to be replaced with a new sample module to be tested.

According to another embodiment of the invention the amplifier 100 and the alignment function of the servodrive 102 are eliminated. Alignment of images is accomplished within the comparator 96.

For convenience the reference marks 37 are also referred to as datum spots or alignment dots.

According to another embodiment of the invention Z-positional amplifiers and drives corresponding to the X- and Y-amplifiers and drives are included in the systems of FIGS. 4 through 9. These serve to move the support 14 closer or further from the detectors 24 or 40, when such adjustment is needed.

While embodiments of the invention have been described in detail, it will be obvious to those skilled in the art that invention may be embodied otherwise within its spirit and scope.

The thicknesses of the substrate, substrate portions and circuitry have been exaggerated in FIGS. 2–4 for clarity. The actual thicknesses conform to those normal in the practice of the art.

What is claimed is:

1. A system for testing modules having substrates that carry electrical circuitry and contain fluorescing substances comprising:
   - energy means for irradiating said module and causing said substrates to fluoresce to thereby form a shadow image of said circuitry;
   - sensing means for detecting the shadow image of said circuitry formed by the fluorescing substrate;
   - standard means corresponding to a desired shape of said circuitry; and
   - comparison means for comparing the image of said circuitry with said standard means.

2. A system as in claim 1, further comprising:
   - control means for rejecting or accepting the sample on the basis of said comparison.

3. A system as in claim 1, wherein
   - said energy means irradiates said module with an energy band outside the visible spectrum; and
   - shade means exclude ambient light from said module.

4. A system as in claim 1, wherein
   - said sensing means include a scanning image tube.

5. A system as in claim 1, wherein
   - said standard means include positive and negative masks of said circuitry;
   - said comparison means include scanning-type image detection means for scanning said masks whereby the images formed by said masks may be compared to said circuitry.

6. A system as in claim 1, wherein
   - said comparison means include electronic memory means for memorizing said standard; and
   - circuit means for comparing said memorized standard to the image of said circuitry.

7. The method of testing a circuit module having a circuitry formed on a fluorescent substrate comprising the steps of:
   - energizing said module so as to make said substrate fluoresce and form an image of said circuitry, said energizing step including irradiating said module with ultraviolet light and excluding ambient light during the energizing process so that the fluorescent substrate can be distinguished; and
   - comparing said image with a standard corresponding to a desired circuit pattern.

8. The method of testing a circuit module having circuitry formed on a substrate comprising the steps of:
   - giving said substrate a fluorescent character;
   - energizing said module so as to make said substrate fluoresce and form an image of said circuitry; and comparing said image with a standard corresponding to a desired circuit pattern, said comparing step including scanning said module with an image detector so that said image is detected and collating said image with said standard.

9. The method of testing a circuit module having circuitry formed on a substrate comprising the steps of:

giving the substrate a fluorescent character, said giving step including applying a fluorescent solution to said module and removing said solution from said circuitry;

energizing said module so as to make said substrate fluoresce and form an image of said circuitry and comparing said image with a standard corresponding to a desired circuit pattern.

10. The method of testing a circuit module having circuitry formed on a substrate comprising the steps of:

giving the substrate a fluorescent character;

energizing said module so as to make said substrate fluoresce and form an image of said circuitry, said energizing step including irradiating said module with ultraviolet light and excluding ambient light during said irradiating step so that said fluorescent substrate can be distinguished and comparing said image with a standard corresponding to a desired circuit pattern.

* * * * *